United States Patent
Lavelle et al.

(10) Patent No.: US 6,859,209 B2
(45) Date of Patent: Feb. 22, 2005

(54) GRAPHICS DATA ACCUMULATION FOR IMPROVED MULTI-LAYER TEXTURE PERFORMANCE

(75) Inventors: Michael G. Lavelle, Saratoga, CA (US); Brian D. Emberling, San Mateo, CA (US); Ranjit S. Oberoi, Saratoga, CA (US); Deron D. Johnson, Newark, CA (US); Ewa M. Kubalska, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 387 days.

(21) Appl. No.: 09/861,468

(22) Filed: May 18, 2001

(65) Prior Publication Data

US 2002/0171672 A1 Nov. 21, 2002

(51) Int. Cl.[7] ................................................. G09G 5/00
(52) U.S. Cl. ........................ 345/582; 345/581; 345/629; 345/583; 345/584; 345/586; 345/589
(58) Field of Search ................................. 345/581, 582, 345/583–588, 589, 629

(56) References Cited

U.S. PATENT DOCUMENTS

| | | | |
|---|---|---|---|
| 6,005,582 A | * | 12/1999 | Gabriel et al. .............. 345/586 |
| 6,288,730 B1 | * | 9/2001 | Duluk et al. ................. 345/552 |
| 6,292,194 B1 | * | 9/2001 | Powell, III ................... 345/582 |
| 6,392,655 B1 | * | 5/2002 | Migdal et al. ............... 345/582 |
| 6,493,858 B2 | * | 12/2002 | Solomon ....................... 716/11 |
| 6,535,220 B2 | * | 3/2003 | Deering et al. .............. 345/582 |
| 6,597,363 B1 | * | 7/2003 | Duluk et al. ................. 345/506 |

* cited by examiner

Primary Examiner—Matthew Luu
Assistant Examiner—Daniel Chung
(74) Attorney, Agent, or Firm—Meyertons Hood Kivlin Kowert & Goetzel, P.C.; Jeffrey C. Hood; Mark K. Brightwell

(57) ABSTRACT

A graphics system applies multiple layers of texture information to triangles. The graphics system includes a hardware accelerator, a frame buffer and a video output processor. The hardware accelerator receives vertices of a triangle, identifies fragments of a sampling space which intersect the triangle, and applies the multiple layers of texture to the intersecting fragments. The multiple layers of textures may be stored in a texture memory external to the hardware accelerator. The hardware accelerator switches to a next texture layer after applying the textures of a current layer to all the fragments of the triangle. The hardware accelerator includes (or couples to) a texture accumulation buffer which stores color values associated with the triangle fragments between the application of successive texture layers. The frame buffer stores the samples and pixels generated from the samples by filtration. The video output processor transforms the pixels into a video signal.

13 Claims, 7 Drawing Sheets

GRAPHICS DATA ACCUMULATION FOR IMPROVED MULTI-LAYER TEXTURE PERFORMANCE

CROSS-REFERENCE TO RELATED APPLICATIONS

Not applicable.

BACKGROUND OF THE INVENTION

1. Field of the Invention

This invention relates generally to the field of computer graphics and, more particularly, to high performance graphics systems for rendering graphical objects based on a decomposition of the graphical objects into triangles.

2. Description of the Related Art

A graphics system may be configured to receive a stream of vertices from a host application executing on a host computer. The vertices specify triangles in a 3D coordinate space. The triangles represent a collection of 3D objects in the 3D world coordinate space. The graphics system may operate on the triangles to generate a video stream which represents the view of a virtual camera (or virtual observer) in the 3D world coordinate space. In particular, the graphics system may compute color values for each pixel that resides within each triangle (i.e. the two-dimensional footprint of the triangle in screen space). This process of assigning color values to pixels (or samples) internal to triangles is referred to herein as triangle rasterization.

Triangle rasterization may include the application of one or more textures. In other words, graphics system may store one or more texture maps in a texture memory and may modify the color of pixels using the one or more texture maps. For example, pixels residing internal to a given triangle comprising part of a wall may be textured with three texture maps, the first map giving the triangle the appearance of brick material, the second map for putting oil smudges on the brick-textured triangle, the third map for varying the level of illumination of pixels on the oil-smudged brick-textured triangle.

According to one conventional rasterization method, each pixel in a given triangle may be textured with all N textures (from the N corresponding texture maps) before proceeding to the next pixel (interior to the triangle) along a scan line or on the next scan line. In other words, a processor may compute color values for a pixel $P_1$ by sequentially accessing a texel from texture map #1, a texel from texture map #2, ..., a texel from texture map #N. Then after completing the computation of color values for pixel PI, the processor may compute color values for the next pixel $P_{I+1}$ interior to the triangle by sequentially accessing a texel from texture map #1, a texel from texture map #2, ..., a texel from texture map #N. This method of texturing triangles may be inefficient in its use of texture memory as the frequency of cache misses and page misses may be large.

Thus, there exists a need for a graphics system and method which could more efficiently apply multiple layers of texture to triangles.

SUMMARY OF THE INVENTION

A graphics system configured to apply multiple layers of texture information to a graphics primitives (e.g. triangles) is disclosed. In one set of embodiments, the graphics system includes a hardware accelerator, a frame buffer and a video output processor. The hardware accelerator receives vertices defining a triangle, identifies fragments (i.e. bins) which intersect the triangle in rendering space, and applies the multiple layers of texture to the intersecting fragments. The multiple layers of textures may be stored in a texture memory external to the hardware accelerator. The hardware accelerator switches to a next texture layer once it has applied the textures of a current layer to all the fragments of the triangle. This scheme of processing fragments as the inner loop and texture layers as the outer loop may increase the average efficiency of accesses to the texture memory. The hardware accelerator includes (or couples to) a texture accumulation buffer which stores color values associated with the triangle fragments between the application of successive texture layers.

The texture layers are interpreted herein as including any information capable of modifying the color of triangle fragments (or the samples the populating the triangle fragments). For example, some of the texture layers may be illumination maps.

The hardware accelerator may generate sample positions in the triangle fragments, identify which of the sample positions reside interior to the triangle, and compute a color vector for each interior sample based on color vectors associated with the triangle vertices. In applying the textures (from the multiple texture layers) to the triangle fragments, the hardware accelerator computes texture values at fragment resolution and applies each texture value to the sample color vectors of the corresponding triangle fragment.

In one set of embodiments, the hardware accelerator may generate samples only after all or most of the texture layers have been applied to the intersecting fragments. An initial color vector may be computed for each intersecting fragment based on a spatial interpolation of color at the triangle vertices. The multiple textures may be cumulatively applied to the initial color vectors. When the samples are generated for the triangle fragments, the finally modified color vectors are applied (e.g. flat filled) to the samples.

The hardware accelerator stores the samples (after application of the multiple texture layers) in a sample area of the frame buffer, subsequently reads and filters the samples to obtain pixel values, and stores the pixel values in a pixel area of the frame buffer. The video output processor reads the pixel values from the pixel area of the frame buffer and generates at least a portion of a video signal from the pixel values. The video signal may be provided to a video output port for display on a display device (e.g. a projector or monitor).

A method for applying multiple layers of texture information to graphics primitives is also contemplated. The method may be implemented in software, hardware or a combination of hardware and software.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
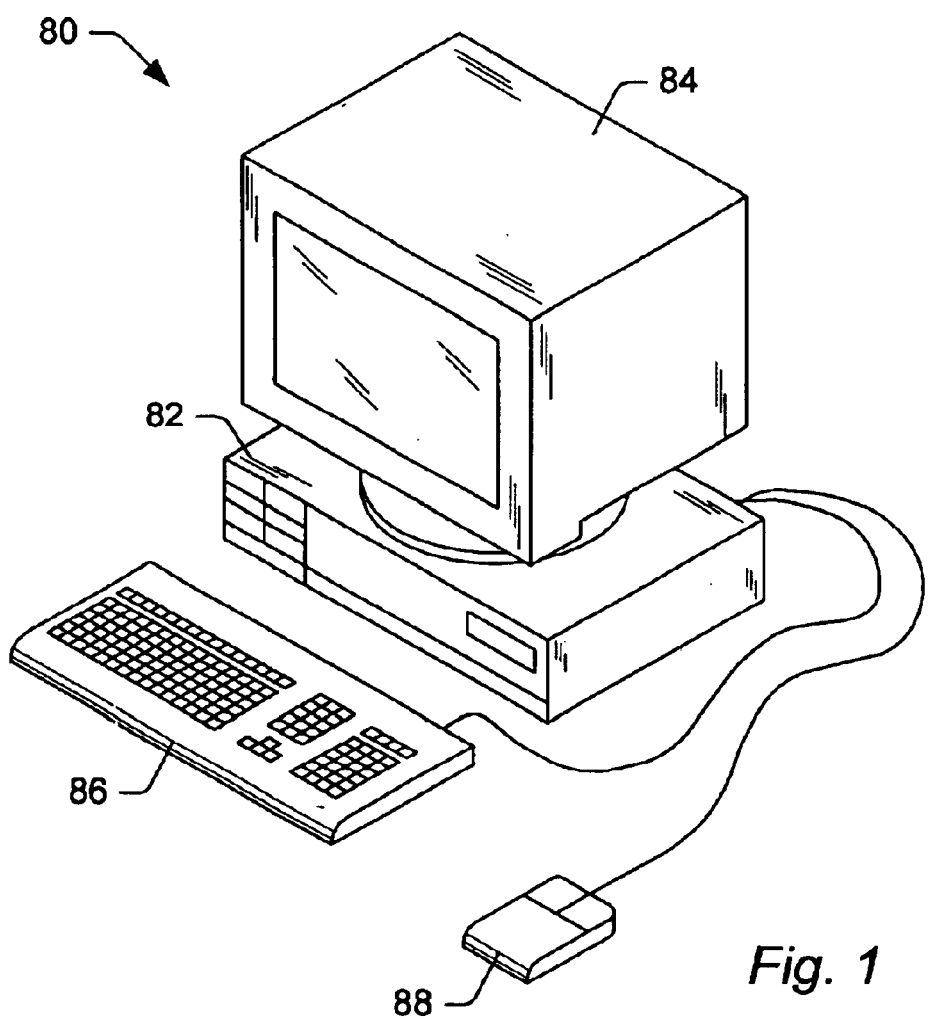
FIG. 1 illustrates one embodiment of a graphics system configured to perform 3D graphics computations for display of graphical object on a display device.

While the invention is susceptible to various modifications and alternative forms, specific embodiments thereof are shown by way of example in the drawings and will be described in detail herein. It should be understood, however, that the drawings and detailed description thereto are not intended to limit the invention to the particular forms disclosed, but on the contrary, the intention is to cover all modifications, equivalents, and alternatives falling within the spirit and scope of the present invention as defined by the appended claims. Please note that the headings are for organizational purposes only and are not meant to limit the description or claims. The word "may" is used in this application in a permissive sense (i.e., having the potential to, being able to), not a mandatory sense (i.e., must). Similarly, the word "include", and derivations thereof, are used herein to mean "including, but not limited to."

DETAILED DESCRIPTION OF SEVERAL EMBODIMENTS

Computer System—FIG. 1

Referring now to FIG. 1, one embodiment of a computer system 80 that includes a graphics system is shown. The graphics system may be comprised in any of various systems, including a computer system, network PC, Internet appliance, a television, including HDTV systems and interactive television systems, personal digital assistants (PDAs), virtual reality systems, and other devices which display 2D and or 3D graphics, among others.

As shown, the computer system 80 comprises a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, or body sensors). Application software may be executed by the computer system 80 to display graphical objects on display device 84.

Figure 2:
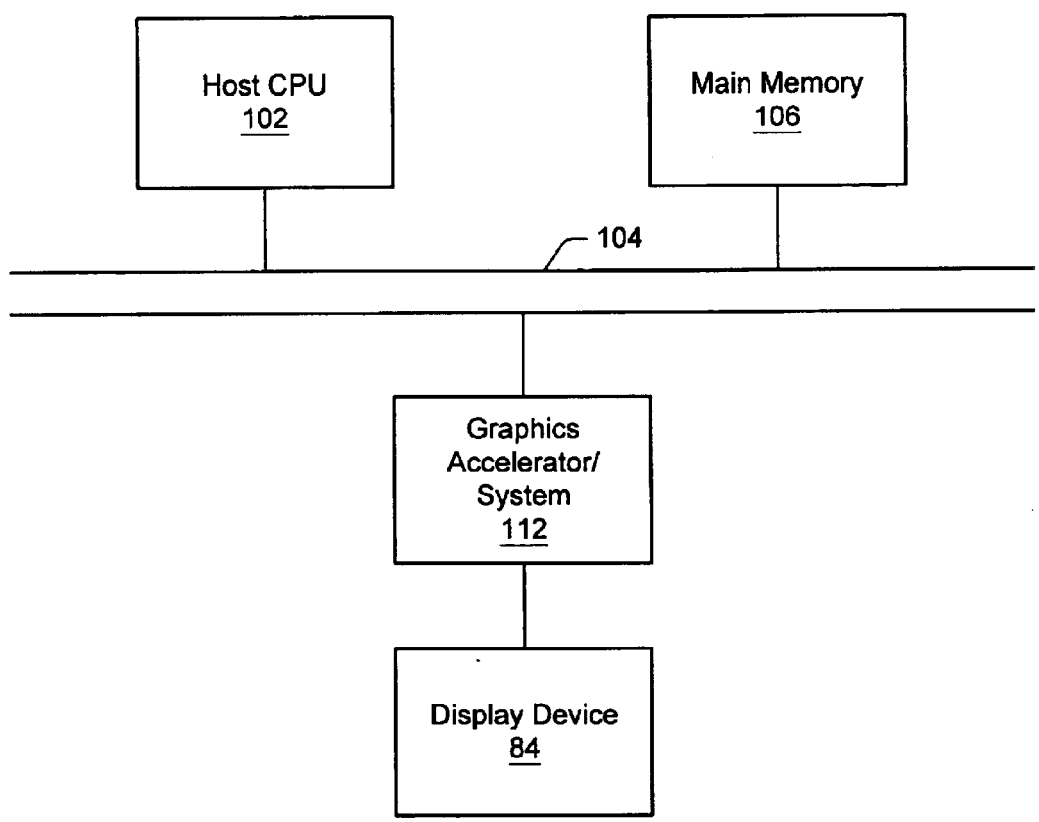
FIG. 2 is a block diagram for one embodiment of computer system 80.

Computer System Block Diagram—FIG. 2

Referring now to FIG. 2, a simplified block diagram illustrating the computer system of FIG. 1 is shown. Elements of the computer system that are not necessary for an understanding of the present invention are not shown for convenience. As shown, the computer system 80 includes a central processing unit (CPU) 102 coupled to a high-speed memory bus or system bus 104 also referred to as the host bus 104. A system memory 106 may also be coupled to high-speed bus 104.

Host processor 102 may comprise one or more processors of varying types, e.g., microprocessors, multi-processors and CPUs. The system memory 106 may comprise any combination of different types of memory subsystems, including random access memories, (e.g., static random access memories or "SRAMs," synchronous dynamic random access memories or "SDRAMs," and Rambus dynamic random access memories or "RDRAM," among others) and mass storage devices. The system bus or host bus 104 may comprise one or more communication or host computer buses (for communication between host processors, CPUs, and memory subsystems) as well as specialized subsystem buses.

In FIG. 2, a graphics system 112 is coupled to the high-speed memory bus 104. The 3-D graphics system 112 may be coupled to the bus 104 by, for example, a crossbar switch or other bus connectivity logic. It is assumed that various other peripheral devices, or other buses, may be connected to the high-speed memory bus 104. It is noted that the graphics system may be coupled to one or more of the buses in computer system 80 and/or may be coupled to various types of buses. In addition, the graphics system may be coupled to a communication port and thereby directly receive graphics data from an external source, e.g., the Internet or a network. As shown in the figure, one or more display devices 84 may be connected to the graphics system 112 comprised in the computer system 80.

Host CPU 102 may transfer information to and from the graphics system 112 according to a programmed input/output (I/O) protocol over host bus 104. Alternately, graphics system 112 may access the memory subsystem 106 according to a direct memory access (DMA) protocol or through intelligent bus mastering.

A graphics application program conforming to an application programming interface (API) such as OpenGL or Java 3D may execute on host CPU 102 and generate commands and data that define a geometric primitive (graphics data) such as a polygon for output on display device 84. As defined by the particular graphics interface used, these primitives may have separate color properties for the front and back surfaces. Host processor 102 may transfer this graphics data to memory subsystem 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including the host CPU 102 and/or the system memory 106, other memory, or from an external source such as a network, e.g., the Internet, or from a broadcast medium, e.g., television, or from other sources.

Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module. Additionally, in some embodiments, certain elements of the illustrated graphics system 112 may be implemented in software.

Figure 3:
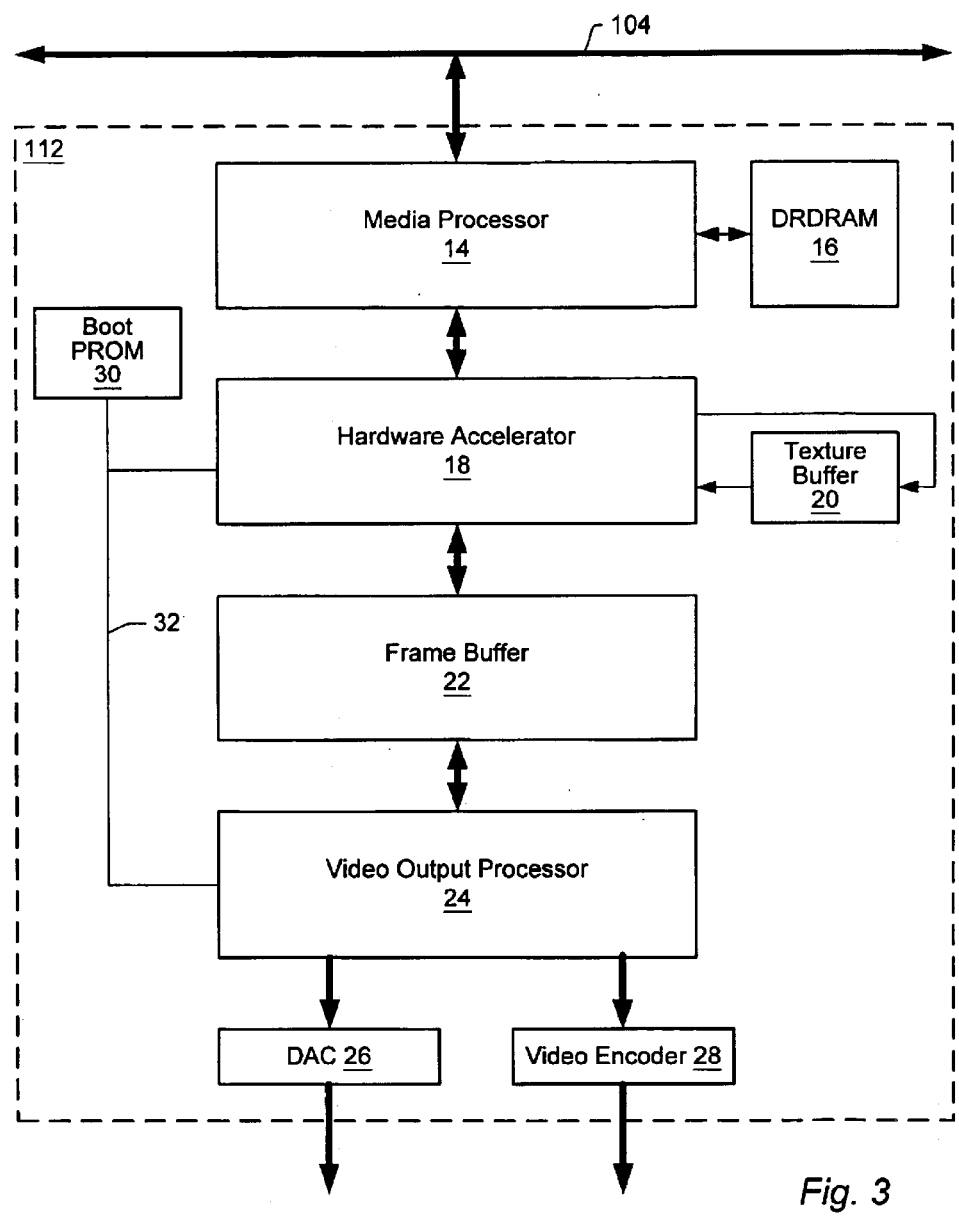
FIG. 3 is a block diagram for one embodiment of a graphics system configured to generate one or more video streams in response to received graphics data.

Graphics System—FIG. 3

Referring now to FIG. 3, a functional block diagram illustrating one embodiment of graphics system 112 is shown. Note that many other embodiments of graphics system 112 are possible and contemplated. Graphics system 112 may comprise one or more media processors 14, one or more hardware accelerators 18, one or more texture buffers 20, one or more frame buffers 22, and one or more video output processors 24. Graphics system 112 may also comprise one or more output devices such as digital-to-analog converters (DACs) 26, video encoders 28, flat-panel-display drivers (not shown), and/or video projectors (not shown). Media processor 14 and/or hardware accelerator 18 may be any suitable type of high performance processor (e.g., specialized graphics processors or calculation units, multimedia processors, DSPs, or general purpose processors).

In some embodiments, one or more of these components may be removed. For example, the texture buffer may not be included in an embodiment that does not provide texture mapping. In other embodiments, all or part of the functionality implemented in either or both of the media processor or the graphics accelerator may be implemented in software.

In some embodiments, media processor 14 and hardware accelerator 18 may be comprised within the same integrated circuit. In other embodiments, portions of media processor 14 and/or hardware accelerator 18 may be comprised within separate integrated circuits.

As shown, graphics system 112 may include an interface to a host bus such as host bus 104 in FIG. 2 to enable graphics system 112 to communicate with a host system such as computer system 80. More particularly, host bus 104 may allow a host processor to send commands to the graphics system 112. In one embodiment, host bus 104 may be a bi-directional bus.

Figure 4:
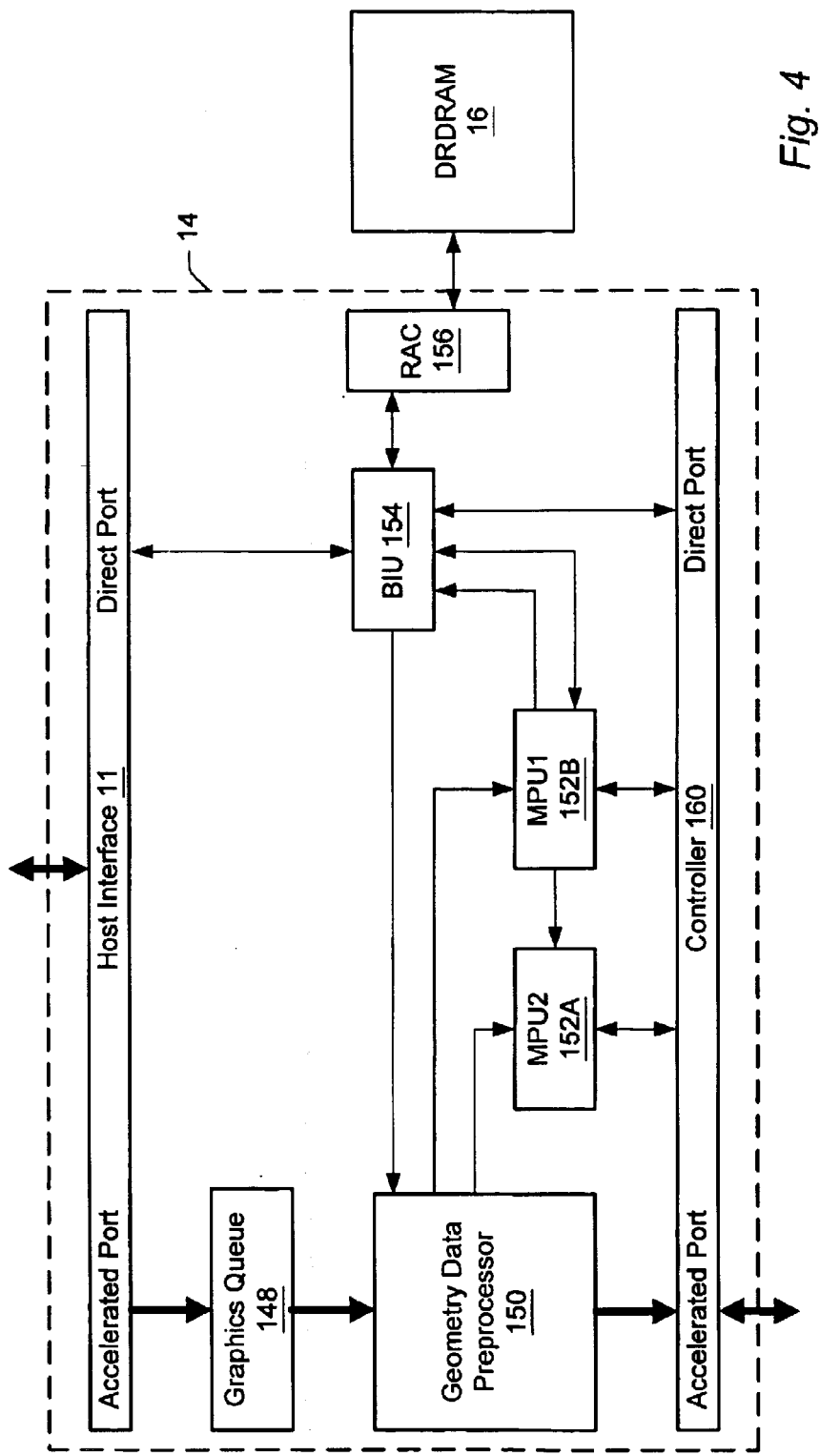
FIG. 4 is a block diagram for one embodiment of media processor 14.

Media Processor—FIG. 4

FIG. 4 shows one embodiment of media processor 14. As shown, media processor 14 operates as the interface between graphics system 112 and computer system 80 by controlling the transfer of data between graphics system 112 and computer system 80. In some embodiments, media processor 14 may also be configured to perform transform, lighting, and/or other general-purpose processing on graphical data.

Transformation refers to manipulating an object and includes translating the object (i.e., moving the object to a different location), scaling the object (i.e., stretching or shrinking), and rotating the object (e.g., in three-dimensional space, or "3-space").

Lighting refers to calculating the illumination of the objects within the displayed image to determine what color and or brightness each individual object will have. Depending upon the shading algorithm being used (e.g., constant, Gourand, or Phong), lighting may be evaluated at a number of different locations. For example, if constant shading is used (i.e., each pixel of a polygon has the same lighting), then the lighting need only be calculated once per polygon. If Gourand shading is used, then the lighting is calculated once per vertex. Phong shading calculates the lighting on a per-pixel basis.

As illustrated, media processor 14 may be configured to receive graphical data via host interface 11. A graphics queue 148 may be included in media processor 14 to buffer a stream of data received via the accelerated port of host interface 11. The received graphics data may comprise one or more graphics primitives. As used herein, the term graphics primitive may include polygons, parametric surfaces, splines, NURBS (non-uniform rational B-splines), sub-divisions surfaces, fractals, volume primitives, voxels (i.e., three-dimensional pixels), and particle systems. In one embodiment, media processor 14 may also include a geometry data preprocessor 150 and one or more microprocessor units (MPUs) 152. MPUs 152 may be configured to perform vertex transform and lighting calculations and programmable functions and to send results to hardware accelerator 18. MPUs 152 may also have read/write access to texels (i.e. the smallest addressable unit of a texture map, which is used to "wallpaper" a three-dimensional object) and pixels in the hardware accelerator 18. Geometry data preprocessor 150 may be configured to decompress geometry, to convert and format vertex data, to dispatch vertices and instructions to the MPUs 152, and to send vertex and attribute tags or register data to hardware accelerator 18.

As shown, media processor 14 may have other possible interfaces, including an interface to a memory. For example, as shown, media processor 14 may include direct Rambus interface 156 to a direct Rambus DRAM (DRDRAM) 16. A memory such as DRDRAM 16 may be used for program and data storage for MPUs 152. DRDRAM 16 may also be used to store display lists and/or vertex texture maps.

Media processor 14 may also include interfaces to other functional components of graphics system 112. For example, media processor 14 may have an interface to another specialized processor such as hardware accelerator 18. In the illustrated embodiment, controller 160 includes an accelerated port path that allows media processor 14 to control hardware accelerator 18. Media processor 14 may also include a direct interface, such as bus interface unit (BIU) 154, which provides a direct port path to memory 16 and to hardware accelerator 18 and video output processor 24 via controller 160.

Figure 5:
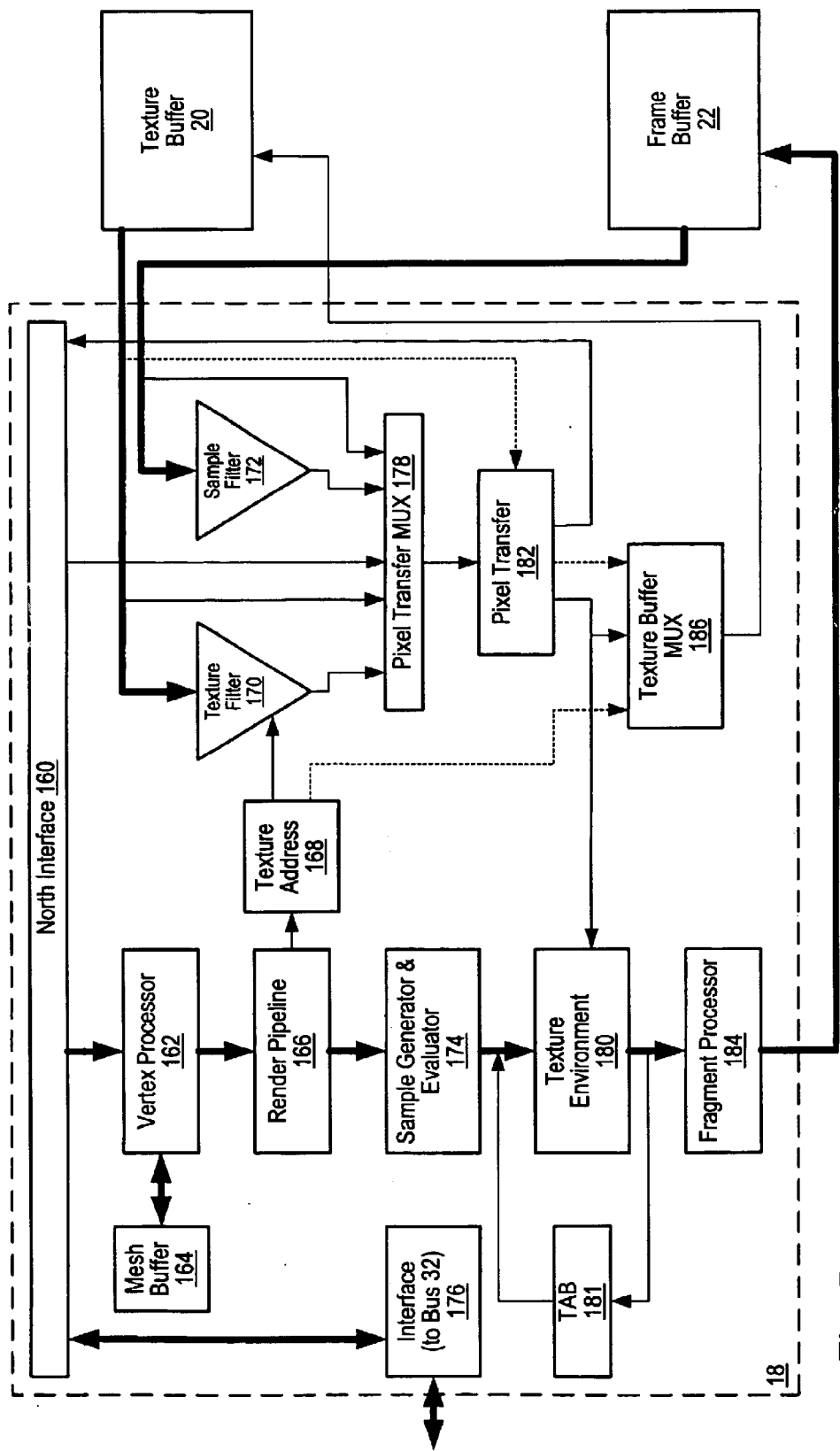
FIG. 5 is a block diagram for one embodiment of hardware accelerator 18.

Hardware Accelerator—FIG. 5

One or more hardware accelerators 18 may be configured to receive graphics instructions and data from media processor 14 and then to perform a number of functions on the received data according to the received instructions. For example, hardware accelerator 18 may be configured to perform rasterization, 2D or 3D texturing, pixel transfers, imaging, fragment processing, clipping, depth cueing, transparency processing, set-up, and/or screen space rendering of various graphics primitives occurring within the graphics data.

Clipping refers to the elimination of graphics primitives or portions of graphics primitives that lie outside of a 3D view volume in world space. The 3D view volume may represent that portion of world space that is visible to a virtual observer (or virtual camera) situated in world space. For example, the view volume may be a solid truncated pyramid generated by a 2D view window and a viewpoint located in world space. The solid truncated pyramid may be imagined as the union of all rays emanating from the viewpoint and passing through the view window. The viewpoint may represent the world space location of the virtual observer. In most cases, primitives or portions of primitives that lie outside the 3D view volume are not currently visible and may be eliminated from further processing. Primitives or portions of primitives that lie inside the 3D view volume are candidates for projection onto the 2D view window.

Set-up refers to mapping primitives to a three-dimensional viewport. This involves translating and transforming the objects from their original "world-coordinate" system to the established viewport's coordinates. This creates the correct perspective for three-dimensional objects displayed on the screen.

Screen-space rendering refers to the calculation performed to generate the data used to form each pixel that will be displayed. For example, hardware accelerator 18 may calculate "samples." Samples are points that have color information but no real area. Samples allow hardware accelerator 18 to "super-sample," or calculate more than one sample per pixel. Super-sampling may result in a higher quality image.

Hardware accelerator 18 may also include several interfaces. For example, in the illustrated embodiment, hardware accelerator 18 has four interfaces. Hardware accelerator 18 has an interface 161 (referred to as the "North Interface") to communicate with media processor 14. Hardware accelerator 18 may also be configured to receive commands from media processor 14 through this interface. Additionally, hardware accelerator 18 may include an interface 176 to bus 32. Bus 32 may connect hardware accelerator 18 to boot PROM 30 and/or video output processor 24. Boot PROM 30 may be configured to store system initialization data and/or control code for frame buffer 22. Hardware accelerator 18 may also include an interface to a texture memory 20. For example, hardware accelerator 18 may interface to texture memory 20 using an eight-way interleaved texel bus that allows hardware accelerator 18 to read from and write to texture memory 20. Hardware accelerator 18 may also interface to a frame buffer 22. For example, hardware accelerator 18 may be configured to read from and/or write to frame buffer 22 using a four-way interleaved pixel bus.

The vertex processor 162 may be configured to use the vertex tags received from the media processor 14 to perform ordered assembly of the vertex data from the MPUs 152. Vertices may be saved in and/or retrieved from a mesh buffer 164.

The render pipeline 166 may be configured to receive vertices and convert them to fragments. The render pipeline 166 may be configured to rasterize 2D window system primitives (e.g., dots, fonts, Bresenham lines, polygons, rectangles, fast fills, and BLITs (Bit Block Transfers, which move a rectangular block of bits from main memory into display memory, which may speed the display of moving objects on screen)) and 3D primitives (e.g., smooth and large dots, smooth and wide DDA (Digital Differential Analyzer) lines, triangles, polygons, and fast clear) into pixel fragments. The render pipeline 166 may be configured to handle full-screen size primitives, to calculate plane and edge slopes, and to interpolate data down to pixel tile resolution using interpolants or components such as r, g, b (i.e., red, green, and blue vertex color); r2, g2, b2 (i.e., red, green, and blue specular color from lit textures); a (alpha); and z, s, t, r, and w (texture components).

In embodiments using supersampling, the sample generator 174 may be configured to generate samples from the fragments output by the render pipeline 166 and to determine which samples are inside the rasterization edge. Sample positions may be defined in loadable tables to enable stochastic sampling patterns.

Hardware accelerator 18 may be configured to write textured fragments from 3D primitives to frame buffer 22. The render pipeline 166 may send pixel tiles defining r, s, t and w to the texture address unit 168. The texture address unit 168 may determine the set of neighboring texels that are addressed by the fragment(s), as well as the interpolation coefficients for the texture filter, and write texels to the texture memory 20. The texture memory 20 may be interleaved to obtain as many neighboring texels as possible in each clock. The texture filter 170 may perform bilinear, trilinear or quadlinear interpolation. The pixel transfer unit 182 may also scale and bias and/or lookup texels. The texture environment 180 may apply texels to samples produced by the sample generator 174. The texture environment 180 may also be used to perform geometric transformations on images (e.g., bilinear scale, rotate, flip) as well as to perform other image filtering operations on texture buffer image data (e.g., bicubic scale and convolutions).

In the illustrated embodiment, the pixel transfer MUX 178 controls the input to the pixel transfer unit 182. The pixel transfer unit 182 may selectively unpack pixel data received via north interface 161, select channels from either the frame buffer 22 or the texture memory 20, or select data received from the texture filter 170 or sample filter 172.

The pixel transfer unit 182 may be used to perform scale, bias, and/or color matrix operations, color lookup operations, histogram operations, accumulation operations, normalization operations, and/or min/max functions. Depending on the source of and operations performed on the processed data, the pixel transfer unit 182 may then output the data to the texture memory 20 (via the texture buffer MUX 186), the frame buffer 22 (via the texture environment unit 180 and the fragment processor 184), or to the host (via north interface 161). For example, in one embodiment, when the pixel transfer unit 182 receives pixel data from the host via the pixel transfer MUX 178, the pixel transfer unit 182 may be used to perform a scale and bias or color matrix operation, followed by a color lookup or histogram operation, followed by a min/max function. The pixel transfer unit 182 may then output data to either the texture memory 20 or the frame buffer 22.

Fragment processor 184 may be used to perform standard fragment processing operations such as the OpenGL fragment processing operations. For example, the fragment processor 184 may be configured to perform the following operations: fog, area pattern, scissor, alpha/color test, ownership test (WID), stencil test, depth test, alpha blends or logic ops (ROP), plane masking, buffer selection, pick hit/occlusion detection, and/or auxiliary clipping in order to accelerate overlapping windows.

Texture Memory 20

Texture memory 20 may include several SDRAMs. Texture memory 20 may be configured to store texture maps and image processing buffers for hardware accelerator 18. Texture memory 20 may have many different capacities (e.g., depending on the type of SDRAM included in texture memory 20). In some embodiments, each pair of SDRAMs may be independently row and column addressable.

Frame Buffer 22

Graphics system 112 may also include a frame buffer 22. In one embodiment, frame buffer 22 may include multiple 3DRAM64s. Frame buffer 22 may be configured as a display pixel buffer, an offscreen pixel buffer, and/or a supersample buffer. Furthermore, in one embodiment, certain portions of frame buffer 22 may be used as a display pixel buffer, while other portions may be used as an offscreen pixel buffer and supersample buffer.

Figure 6:
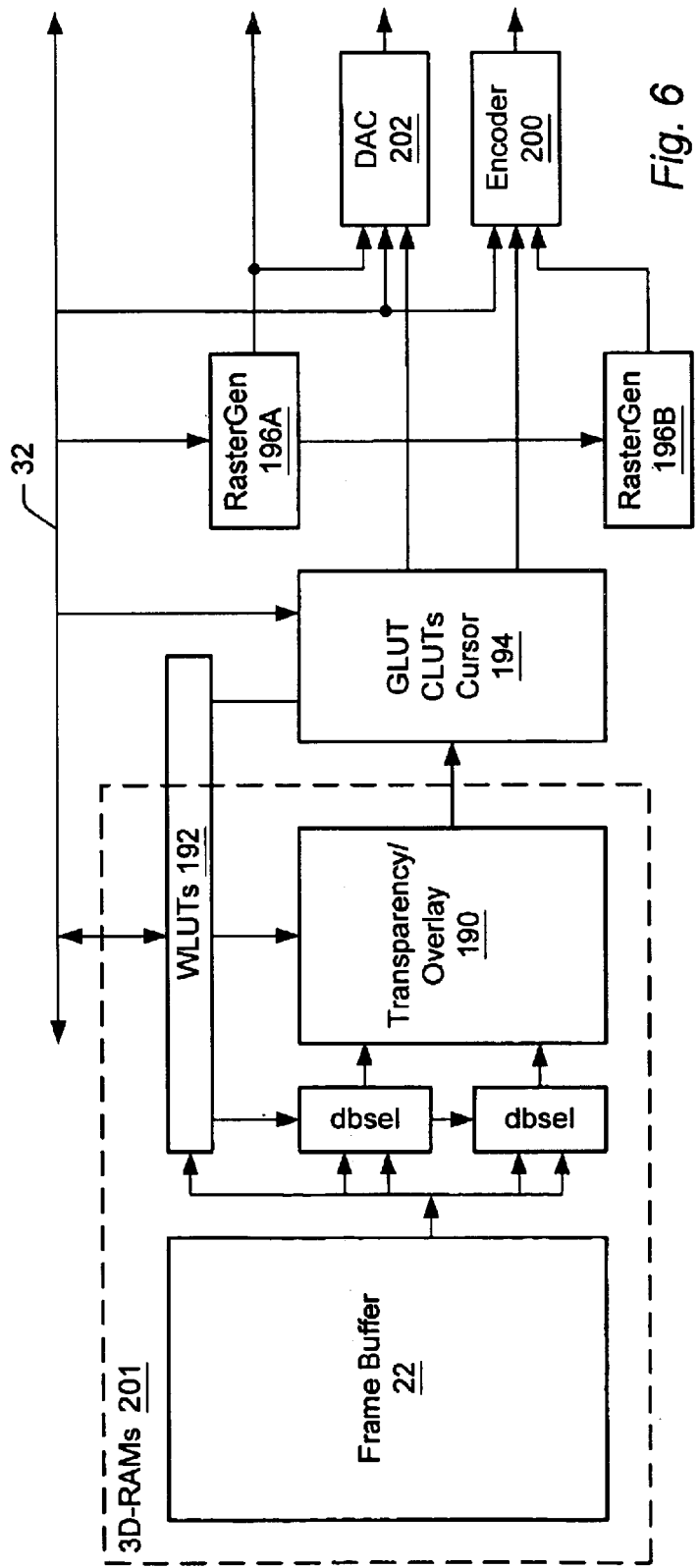
FIG. 6 is a block diagram for one embodiment of video output processor 24.

Video Output Processor—FIG. 6

A video output processor 24 may also be included within graphics system 112. Video output processor 24 may buffer and process pixels output from frame buffer 22. For example, video output processor 24 may be configured to read bursts of pixels from frame buffer 22. Video output processor 24 may also be configured to perform double buffer selection (dbsel) if the frame buffer 22 is double-buffered, overlay transparency (using transparency/overlay unit 190), plane group extraction, gamma correction, psuedocolor or color lookup or bypass, and/or cursor generation. For example, in the illustrated embodiment, the output processor 24 includes WID (Window ID) lookup tables (WLUTs) 192 and gamma and color map lookup tables (GLUTs, CLUTs) 194. In one embodiment, frame buffer 22 may include multiple 3DRAM64s 201 that include the transparency overlay 190 and all or some of the WLUTs 192. Video output processor 24 may also be configured to support two video output streams to two displays using the two independent video raster timing generators 196. For example, one raster (e.g., 196A) may drive a 1280×1024 CRT while the other (e.g., 196B) may drive a NTSC or PAL device with encoded television video.

DAC 202 may operate as the final output stage of graphics system 112. The DAC 202 translates the digital pixel data received from GLUT/CLUTs/Cursor unit 194 into analog video signals that are then sent to a display device. In one embodiment, DAC 202 may be bypassed or omitted completely in order to output digital pixel data in lieu of analog video signals. This may be useful when a display device is based on a digital technology (e.g., an LCD-type display or a digital micro-mirror display).

DAC 202 may be a red-green-blue digital-to-analog converter configured to provide an analog video output to a display device such as a cathode ray tube (CRT) monitor. In one embodiment, RGB DAC 202 may be configured to provide a high resolution RGB analog video output at dot rates of 240 MHz. Similarly, encoder 200 may be configured to supply an encoded video signal to a display. For example, encoder 200 may provide encoded NTSC or PAL video to an S-Video or composite video television monitor or recording device.

In other embodiments, the video output processor 24 may output pixel data to other combinations of displays. For example, by outputting pixel data to two DACs 202 (instead of one DAC 202 and one encoder 200), video output processor 24 may drive two CRTs. Alternately, by using two encoders 200, video output processor 24 may supply appropriate video input to two television monitors. Generally, many different combinations of display devices may be supported by supplying the proper output device and/or converter for that display device.

Overall Processing Flow

Hardware accelerator 18 receives vertices defining triangles from media processor 14, and renders the triangles in terms of samples. The samples are stored in a sample area of frame buffer 22. The samples are then read from the sample area of frame buffer 22 and filtered by sample filter 22 to generate pixels. The pixels are stored in a pixel area of frame buffer 22. The pixel area may be double buffered. Video output processor 24 reads pixels from the pixel area of frame buffer 22 and generate a video signal from the pixels. The video signal is made available to one or more display devices (e.g. monitors and/or projectors).

Figure 7:
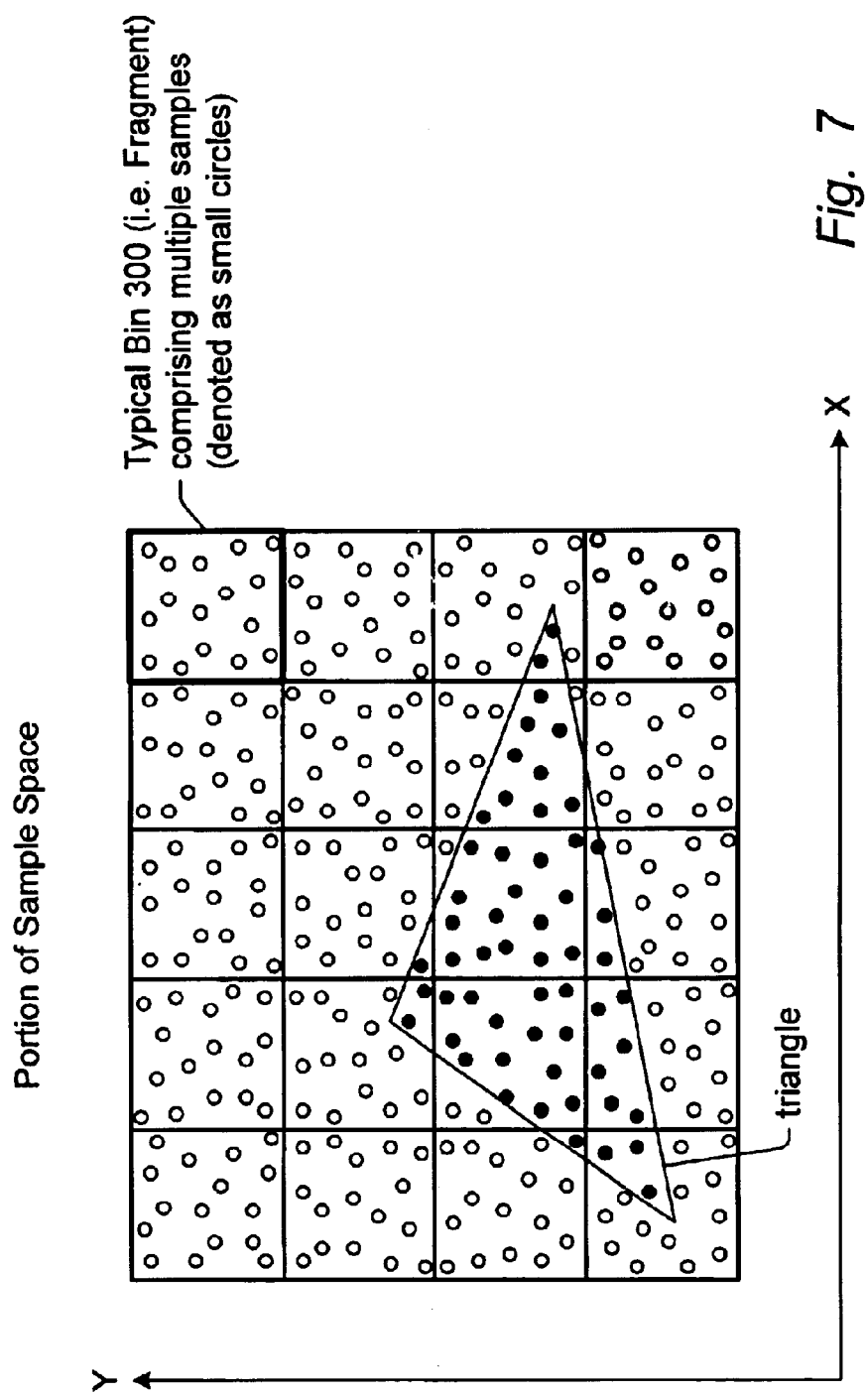
FIG. 7 illustrates a portion of rendering space populated with samples and partitioned into fragments (i.e. bins) according to one set of embodiments.

The samples are computed at positions in a two-dimensional sample space (also referred to as rendering space). The sample space is partitioned into an array of bins (also referred to herein as fragments). The storage of samples in the sample area of frame buffer 22 is organized according to bins (e.g. bin 300) as illustrated in FIG. 7. Each bin contains one or more samples. The number of samples per bin may be a programmable parameter.

Texture Pipe and Multitexturing Support

As shown in FIG. 5, in one embodiment, the texture pipe includes texture address unit 168, texture filter 170, texture environment 180 and texture accumulation buffer (TAB) 181. In addition, pixel transfer MUX 178 and pixel transfer unit 182 participate in texture processing operations.

The texture pipe is configured to apply multiple layers of texture to triangles. The multiple layers of texture are stored in texture memory 20. Each layer may comprise multiple mipmap levels. Let N be the number of texture layers stored in texture memory 20.

Render pipe 166 receives vertices defining a current triangle from vertex processor 162. Render pipe 166 determines a set of fragments (i.e. bins) which intersect the current triangle. For each intersecting fragment $F_j$, render pipe 166:

(a) sends the fragment $F_j$ to sample generator and evaluator 174 for sample processing; and
(b) sends a request to the texture pipe for a layer-zero texture value $T0_j$ corresponding to fragment $F_j$.

In response to receiving the fragment $F_j$, sample generator and evaluator 174:

(1) populates the fragment $F_j$ with sample positions $S_{jk}$;
(2) determines which of the sample positions $S_{jk}$ reside interior to the current triangle;
(3) computes an initial color vector $C0_{jk}$ for each sample position $S_{jk}$ interior to the current triangle; and
(4) forwards the fragment $F_j$ including the sample color vectors $C0_{jk}$ corresponding to interior sample positions to texture environment 180.

The index j corresponds to fragments. The index k corresponds to samples. The index pair jk corresponds to a sample within a fragment.

In response to request (b), the texture pipe accesses the layer-zero texture map of texture memory 20 to obtain layer-zero texels, and performs bilinear (or trilinear) filtering to generate the layer-zero texture value $T0_j$.

Texture address unit 168 receives the fragment address of fragment $F_j$ from render pipe 166, and generates read addresses (in the address space of texture memory 20) for the layer-zero texels which contribute to the computation of layer-zero texture value $T0_j$.

Texture filter 170 uses the read addresses to access the layer-zero texels and performs the bilinear (or trilinear) filtering on the layer-zero texels to generate the layer-zero texture value $T0_j$. The layer-zero texture value $T0_j$ is then fed through pixel transfer MUX 178 and pixel transfer unit 182 to texture environment 180.

Texture environment 180 receives the initial color vectors $C0_{jk}$ for each interior sample position in the fragment $F_j$ and the layer-zero texture value $T0_j$, applies the layer-zero texture value $T0_j$ to the initial color vector $C0_{jk}$ of each interior sample position $S_{jk}$ to generate resultant color vectors $R0_{jk}$. The resultant color vectors $R0_{jk}$ for the interior samples of fragment $F_j$ are stored in TAB 181.

Any of a variety of mathematical algorithms (including conventional algorithms) may be used by texture environment 180 to apply the texture values to the initial color vectors. Texture environment 180 may be programmable to employ different texturing algorithms at different times. Alternatively, texture environment 180 may employ an algorithm with fixed mathematical structure but modifiable parameters. In one embodiment, texture environment 180 may comprise dedicated circuitry for implementing one or more texturing algorithms.

In one set of embodiments, the initial color vector $C0_{jk}$ contains a transparency value in addition to red, green and blue color values (e.g. diffuse color values). Other per-sample attributes may be included as well.

Texture pipe and rendering pipe process all the intersecting fragments $F_j$ (i.e. all the fragments $F_j$ which intersect the current triangle) with respect to texture layer zero before proceeding to texture layer one. This is illustrated by the following pseudo-code fragment.

For each intersecting fragment $F_j$:
  Render pipe generates initial color vector $C0_{jk}$ for each interior sample $S_{jk}$;
  Texture pipe generates layer-zero texture value $T0_j$;
  Texture environment applies $T0_j$ to each of the initial color vectors $C0_{jk}$ to obtain resultant sample color vectors $R0_{jk}$;
  Texture environment stores vectors $R0_{jk}$ in TAB 180.

The initial color vectors $C0_{jk}$ may be computed based on a spatial interpolation of the color vectors associated with the triangle vertices.

After processing all the intersecting fragments $F_j$ with respect to layer zero, the texture pipe processes all the intersecting fragments $F_j$ with respect to texture layer one as follows. For each intersecting fragment $F_j$, the texture pipe generates a corresponding layer-one texture value $T1_j$ by accessing and filtering appropriate texels from texture layer one of texture memory 20. Texture environment 180 reads sample color vectors $R0_{jk}$ corresponding to fragment $F_j$ from TAB 181 and applies the layer-one texture value $T1_j$ to each of the sample color vectors $R0_{jk}$, thereby generating resultant sample color vectors $R1_{jk}$. Each sample of the fragment $F_j$ includes a valid bit indicating whether it resides interior or exterior to the current triangle. Only the color vectors $R0_{jk}$ of samples interior to the current triangle need be modified with the texture value. Texture environment 180 stores the resultant sample color vectors $R1_{jk}$ for fragment $F_j$ into TAB 181. In the preferred embodiment, texture environment 180 overwrites fragment $F_j$ in TAB 181 with the update color information, i.e. overwrites the color vectors $R0_{jk}$ with the updated color vectors $R1_{jk}$.

Texture layers two through N−1 are applied in same fashion as layer one as illustrated by the following pseudocode fragment. Let I be any integer in the range 1, 2, ..., N−1.

For each fragment $F_j$:
Texture pipe generates layer I texture value $TI_j$ by accessing and filtering appropriate texels from layer I of texture memory 20;
Texture environment reads fragment $F_j$ from TAB 181;
Texture environment applies texture value $TI_j$ to sample color vectors $R(I-1)_{jk}$ comprised within fragment $F_j$ and corresponding to interior samples to obtain resultant sample color vectors $R1_{jk}$;
Texture environment stores resultant sample color vectors $R1_{jk}$ in TAB 181.

Thus, layer zero texture is applied to sample colors received from sample generator and evaluation unit, whereas layers one though N−1 are applied to sample colors received from TAB 181.

In the application of the last texture layer N−1, texture environment 180 may store the final sample color vectors $RN_{jk}$ into TAB 181 and send pointers to the fragments $F_j$ to fragment processor 184 (i.e. pointers in the TAB address space). Fragment processor 184 may forward the fragments (including the final sample color value vectors $R(N-1)_{jk}$ to the sample area of frame buffer. Alternatively, texture environment 180 may send the final sample color vectors $R(N-1)_{jk}$ directly to fragment processor 184 and thus storage of final sample color vectors $R(N-1)_{jk}$ may be avoided.

In general, texture pipe processes all the intersecting fragments $F_j$ (i.e. all the fragments $F_j$ which intersect the current triangle) with respect to texture layer I before proceeding to texture layer (I+1), where I takes any of the values 0, 1, 2, ..., (N−2). This strategy is significantly more efficient that the conventional strategy of processing all texture layers against fragment $F_j$ before proceeding to the next fragment $F_{j+1}$. Because the processing of successive texture layers is the inner loop, the conventional strategy very frequently makes large magnitude jumps in the address space texture memory 20. Thus, the rate of page misses (and cache misses in those embodiments that have a texture cache) in accesses to texture memory 20 is high.

In contrast, the herein disclosed strategy of processing fragments as the inner loop and texture layers as the outer loop significantly reduces thrashing of texture memory 20. The large magnitude address jump between texture layers may advantageously occur less often. The successive fragments within a texture layer induce relatively small address jumps in the texture memory address space because the fragments are all spatially localized (to a single triangle). Thus, there may be a significantly decreased probability of encountering page misses and cache misses.

It is noted that the processing methodology described in the embodiments above may be used for effects other than traditional texturing. For example, one of the texture layers may be interpreted as an illumination map which modulates the intensity of rendered samples and/or fragments. Thus, the texture layers stored in texture memory 20 should be broadly interpreted to include any of various types of image information capable of modifying pixel or sample colors.

In one set of embodiments, hardware accelerator 18 is an application specific integrated circuit (ASIC) which is optimized for the sample and texture processing operations described herein.

Multitexturing with Deferred Sample Generation

In a second set of embodiments, texture layers are applied to the current triangle at fragment resolution, stored in TAB 181 at fragment resolution, and samples are generated for fragments only after the penultimate texture layer (i.e. layer N−2) has completed.

Render pipe 166 initially generates a single color vector $C0_j$ for each fragment $F_j$ that intersects the current triangle. Thus, color vector $C0_j$ may be referred to as a fragment color vector. Texture environment 180 receives the layer zero texture value $T0_j$ corresponding to each intersecting fragment $F_j$ from pixel transfer unit 182, and applies the layer zero texture value $T0_j$ to the corresponding fragment color vector $C0_j$. The resulting fragment color vector $R0_j$ is stored into TAB 181.

When all the fragments $F_j$ intersecting the current triangle have been processed with respect to layer zero, texture environment 180 processes layer one as follows. Texture environment 180 receives the layer-one texture value $T1_j$ corresponding to each intersecting fragment $F_j$ from pixel transfer unit 182, reads the fragment color vector $R0_j$ corresponding to fragment $F_j$ from TAB 181, and applies the layer-one texture $T1_j$ to fragment color vector $R0_j$ to generate resultant fragment color vector $R1_j$. The resultant fragment color vector $R1_j$ is stored into TAB 181.

Texture layers two through (N−2) are processed in a similar fashion to layer one. Let I be any integer in the range two through N−2. For each intersecting fragment $F_j$, texture environment 180 reads the fragment color vector $R(I-1)_j$, receives the layer I texture value $TI_j$ corresponding to fragment $F_j$ from pixel transfer unit 182, and applies the texture value $TI_j$ to the fragment color vector $R(I-1)_j$ to generate a resultant fragment color vector $RI_j$. The resultant fragment color vector $RI_j$ is stored into TAB 181. All fragments $F_j$ intersecting the current triangle are processed with respect to layer I before proceeding to layer (I+1).

The last texture layer (i.e. layer N−1) is processed as follows. For each intersecting fragment $F_j$, sample generation and evaluation unit 174:

(1) populates the fragment $F_j$ with samples positions $S_{jk}$;
(2) determines which of the sample positions $S_{jk}$ reside interior to the current triangle, and sets a valid flag to indicate the interior or exterior status of each sample $S_{jk}$;
(3) computes z coordinate values for each sample position $S_{jk}$ based on a spatial interpolation of z values at the vertices of the current triangle; and
(4) forwards the fragment $F_j$ including the sample positions $S_{jk}$ and corresponding z values and valid flags to texture environment 180.

Texture environment 180 reads the fragment color vector $R(N-2)_j$ corresponding to fragment $F_j$ from TAB 181, receives layer (N−1) texture value $T(N-1)_j$ from pixel transfer unit 182, and applies the texture value $T(N-1)_j$ to fragment color vector $R(N-2)_j$ to obtain a resultant fragment color vector $R(N-1)_j$. The resultant fragment color vector $R(N-1)_j$ may then be assigned to all the interior samples of fragment $F_j$, i.e. to all sample positions $S_{jk}$ which reside interior to fragment $F_j$. The fragment $F_j$ (now including the final sample color vectors of the interior samples) may be forwarded to fragment processor 184. Fragment processor 184 may store the fragment 184 in a sample area of frame buffer 22. Frame buffer 22 uses the z values of the samples in the fragment $F_j$ to perform z buffering.

In a first set of embodiments described above, color is initially interpolated to sample resolution, and color is updated and stored in TAB 181 at sample resolution, although texture values are computed only at fragment resolution. In a second set of embodiments, color is initially interpolated to fragment resolution, and color is updated and stored in TAB at fragment resolution until the last texture layer is to be applied. At this last stage, samples are generated, the last texture layer is applied at the fragment level, the final texturized color is assigned to all valid samples in the fragment.

In many situations, color does not change significantly for the samples within a given fragment. In these situations, the second set of embodiments of graphics system may generate video output whose visual quality is indistinguishable or negligibly different from the first set of embodiments.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the headings used herein are for organizational purposes only and are not meant to limit the description provided herein or the claims attached hereto.

What is claimed is:

1. A graphics system comprising:

a texture memory configured to store a plurality of texture layers;

a texture accumulation buffer;

a hardware accelerator configured to receive vertices defining a triangle, perform first access operations to a first of said texture layers in the texture memory, apply first textures generated in response to said first access operations to samples residing interior to said triangle resulting in first textured samples, and store the first textured samples in the texture accumulation buffer;

wherein the hardware accelerator is further configured to (a) perform $I^{th}$ access operations to an $I^{th}$ of said texture layers in the texture memory, (b) access the texture accumulation buffer for $(I-1)^{st}$ cumulatively textured samples, (c) apply $I^{th}$ textures generated in response to said $I^{th}$ access operations to the $(I-1)^{st}$ cumulatively textured samples to obtain $I^{th}$ cumulatively textured samples, and (d) store the $I^{th}$ cumulatively textured samples in said texture accumulation buffer;

wherein the hardware accelerator is configured to repeatedly perform (a), (b), (c) and (d) for successive values of the index I, wherein the first textured samples are identical to the $(I1)^{st}$ cumulatively textured samples with I equal to a first of said successive values;

wherein the $I^{th}$ cumulatively textured samples with I equal to a last of said successive values are usable to define a portion of a video output signal displayable on a display device;

wherein the hardware accelerator is further configured to perform final access operations to a final layer of said texture layers in the texture memory, access the texture accumulation buffer for penultimate cumulatively textured samples, apply final textures generated in response to said final access operations to the penultimate cumulatively textured samples to obtain final cumulatively textured samples, wherein the penultimate cumulatively textured samples are the same as the $I^{th}$ cumulatively textured samples with I equal to the last of said successive values.

2. The graphics system of claim 1 further comprising a frame buffer, wherein the hardware accelerator is configured to store said final cumulatively textured samples into a sample area of the frame buffer, wherein the hardware accelerator is further configured to read and filter said final cumulatively textured samples from said sample area of the frame buffer to generate pixel values, to store the pixel values in a pixel area of the frame buffer.

3. The graphics system of claim 2 further comprising a video output processor configured to read the pixel values from the pixel area of the frame buffer and to generate said portion of the video output signal from said pixel values.

4. A graphics system comprising:

a texture memory configured to store a plurality of texture layers;

a hardware accelerator configured to receive vertices defining a current triangle, identify fragments which intersect the current triangle, determine first texture values for said intersecting fragments by accessing a first of said texture layers in said texture memory, compute initial color vectors associated with the intersecting fragments, apply the first texture values respectively to the initial color vectors to generate first resultant color vectors for the intersecting fragments, and store the first resultant color vectors in a texture accumulation buffer;

wherein the hardware accelerator is further configured to determine second texture values for said intersecting fragments by accessing a second of said texture layers in said texture memory, receive the first resultant color vectors for the intersecting fragments from the texture accumulation buffer, apply the second texture values respectively to the first resultant color vectors to generate second resultant color vectors for the intersecting fragments, wherein the second resultant color vectors are usable to form a portion of a displayable image;

wherein the hardware accelerator is configured to generate the first resultant color vectors for all of the intersecting fragments prior to generating any of the second resultant color vectors;

wherein the hardware accelerator is further configured to (a) access and filter $I^{th}$ layer texels from an $I^{th}$ layer of said texture layers in said texture memory to obtain $I^{th}$ layer texture values for said intersecting fragments, (b) read color vectors $R(I-1)_j$ corresponding to the intersecting fragments $F_j$ from the texture accumulation buffer, (c) apply the $I^{th}$ layer texture values respectively to the color vectors $R(I-1)_j$ to generate resultant color vectors $R(I)_j$ for said intersecting fragments $F_j$, and (d) store the resultant color vectors $R(I)_j$ in said texture accumulation buffer;

wherein the hardware accelerator is configured to repeatedly perform (a), (b), (c) and (d) for values of index I running through the range from one to N−2, where N is the number of said texture layers stored in said texture memory, wherein the color vectors $R(0)_j$ are the first resultant color vectors, wherein the color vectors $R(1)_j$ are the second resultant color vectors.

5. The graphics system of claim 4 wherein the hardware accelerator is further configured to complete said accessing of said $I^{th}$ layer texels from the $I^{th}$ layer in said texture memory before initiating accesses to $(I+1)^{st}$ layer texels from the $(I+1)^{st}$ layer in said texture memory.

6. The graphics system of claim 4 wherein the hardware accelerator is further configured to generate sample positions for each of said intersecting fragments, determine which of the sample positions in each intersecting fragment resides interior to the triangle, access and filter $(N-1)^{st}$ layer texels from an $(N-1)^{st}$ layer of said texture layers in said texture memory to obtain $(N-1)^{st}$ layer texture values for said intersecting fragments, read color vectors $R(N-2)_j$ corresponding to the intersecting fragments $F_j$ from the texture accumulation buffer, apply the $(N-1)^{st}$ layer texture values respectively to the color vectors $R(N-2)_j$ to generate resultant color vectors $R(N-1)_j$ for said intersecting fragments $F_j$, and assign each of the resultant color vectors $R(N-1)_j$ to the interior samples of the corresponding intersecting fragment $F_j$;

wherein said samples are usable to form said portion of said displayable image.

7. The graphics system of claim 3 further comprising a display coupled to the video output processor.

8. The graphics system of claim 4, wherein the texture accumulation buffer is configured as part of the hardware accelerator.

9. The graphics system of claim 8, wherein the hardware accelerator is an application specific integrated circuit configured on a single chip.

10. A method for generating graphical images, the method comprising:

a) receiving vertices defining a triangle;

b) performing first access operations to a first texture layer in a texture memory, wherein the texture memory is configured to store a plurality of texture layers;

c) applying first textures generated in response to said first access operations to samples residing interior to said triangle resulting in first textured samples;

d) storing the first textured samples in a texture accumulation buffer;

e) performing $I^{th}$ access operations to an $I^{th}$ texture layer in the texture memory;

f) accessing the texture accumulation buffer for $(I-1)^{st}$ cumulatively textured samples;

g) applying $I^{th}$ textures generated in response to said $I^{th}$ access operations to the $(I-1)^{st}$ cumulatively textured samples to obtain $I^{th}$ cumulatively textured samples;

h) storing the $I^{th}$ cumulatively textured samples in said texture accumulation buffer;

i) repeating e), f), g), and h) for successive values of the index I, wherein the first textured samples are identical to the $(I-1)^{st}$ cumulatively textured samples with I equal to a first of said successive values;

j) performing final access operations to a final layer of said texture layers in the texture memory, by accessing the texture accumulation buffer for penultimate cumulatively textured samples, applying final textures generated in response to said final access operations to the penultimate cumulatively textured samples to obtain final cumulatively textured samples, wherein the penultimate cumulatively textured samples are the same as the $I^{th}$ cumulatively textured samples with I equal to the last of said successive values.

11. The method of claim 10, further comprising using the $I^{th}$ cumulatively textured samples with I equal to a last of said successive values to define a portion of a video output signal displayable on a display device.

12. A method for generating graphical images in a hardware accelerator, the method comprising:

a) receiving vertices defining a current triangle;

b) identifying fragments which intersect the current triangle;

c) determining first texture values for said intersecting fragments by accessing a first texture layer in a texture memory, wherein the texture memory is configured to store a plurality of texture layers;

d) computing initial color vectors associated with the intersecting fragments;

e) applying the first texture values respectively to the initial color vectors to generate first resultant color vectors for the intersecting fragments;

f) storing the first resultant color vectors in a texture accumulation buffer;

g) accessing and filtering $I^{th}$ layer texels from an $I^{th}$ layer of said texture layers in said texture memory to obtain $I^{th}$ layer texture values for said intersecting fragments;

h) reading color vectors $R(I-1)_j$ corresponding to the intersecting fragments $F_j$ from the texture accumulation buffer;

i) applying the $I^{th}$ layer texture values respectively to the color vectors $R(I-1)_j$ to generate resultant color vectors $R(I)_j$ for said intersecting fragments $F_j$;

j) storing the resultant color vectors $R(I)_j$ in said texture accumulation buffer; and k) repeating g), h), i), and j) for values of index I running through the range from one to N-1, where N is the number of said texture layers stored in said texture memory, wherein the color vectors $R(I-1)$ for all of the intersecting fragments are generated prior to generating any of the color vectors $R(I)_j$.

13. The method of claim 12, further comprising using the $R(N-1)_j$ cumulatively textured color vectors to determine pixel values to generate at least a portion of a video output signal displayable on a display device.

* * * * *